United States Patent Office 3,256,438
Patented June 14, 1966

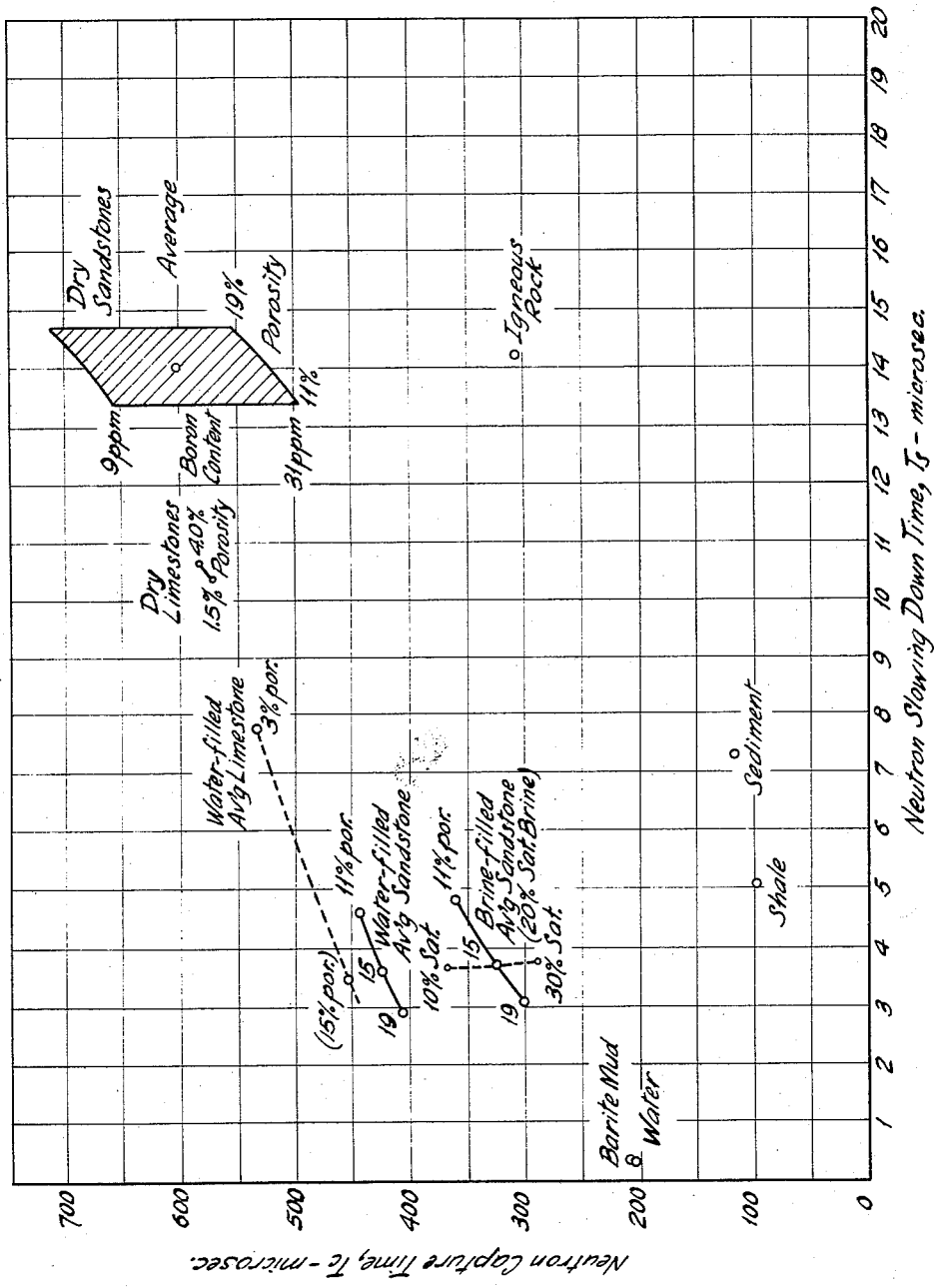

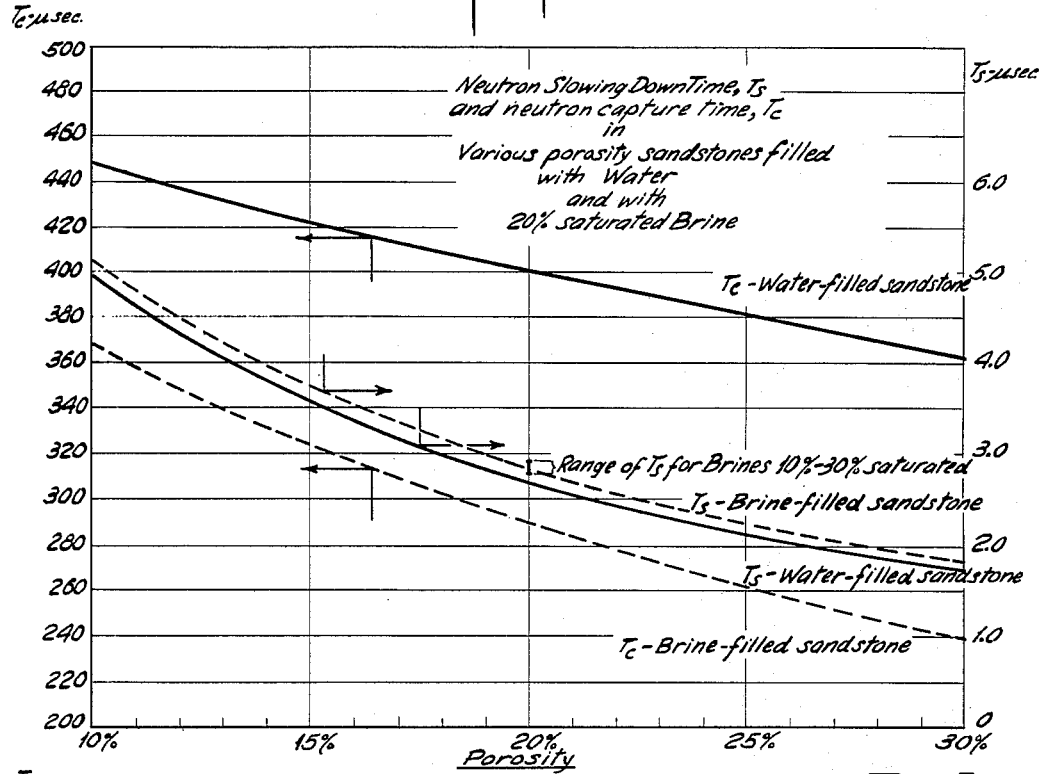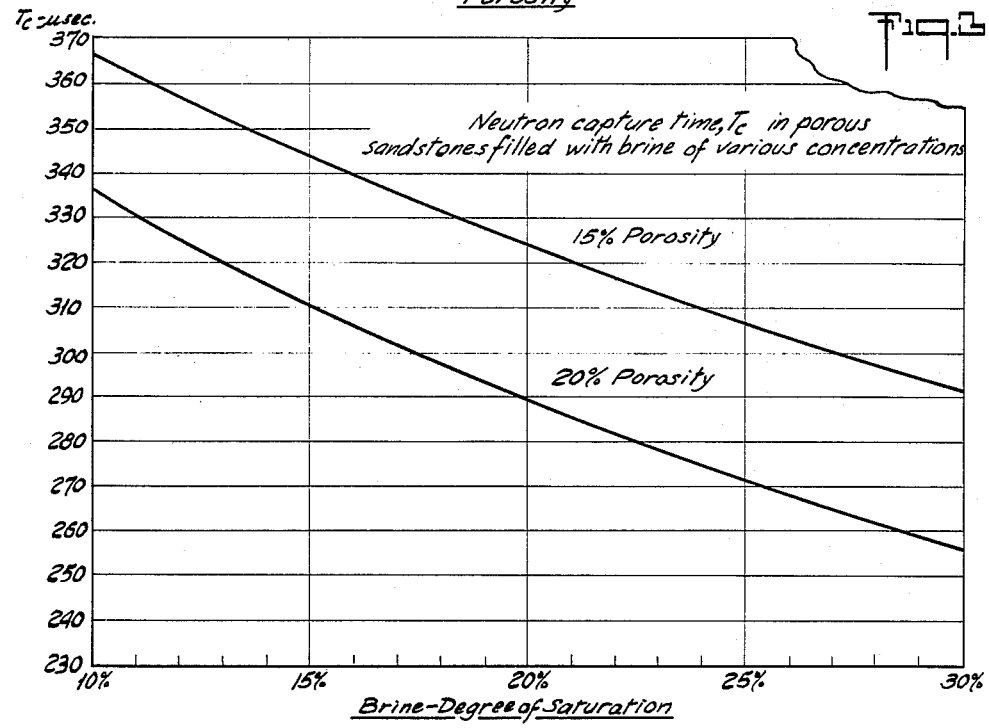

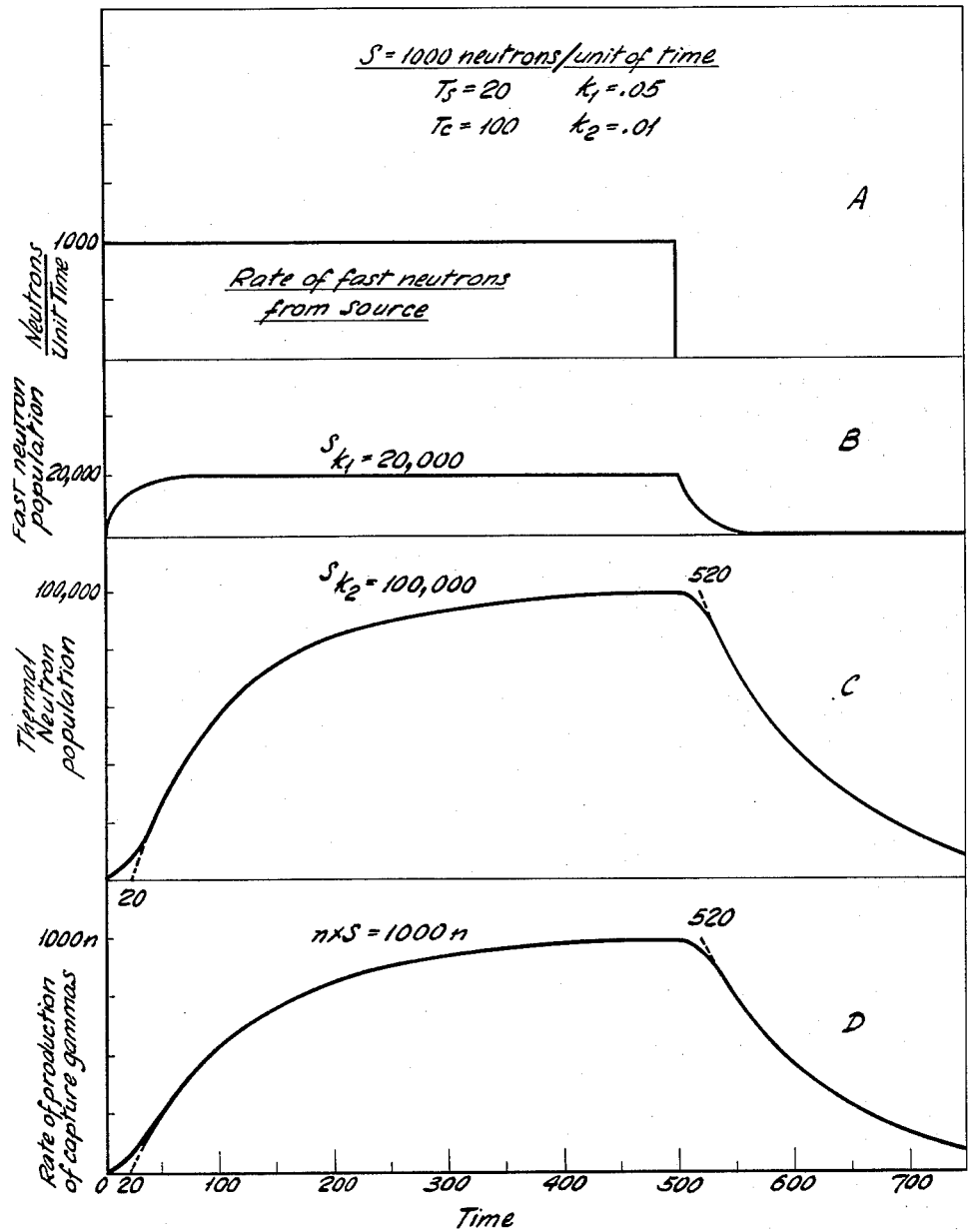

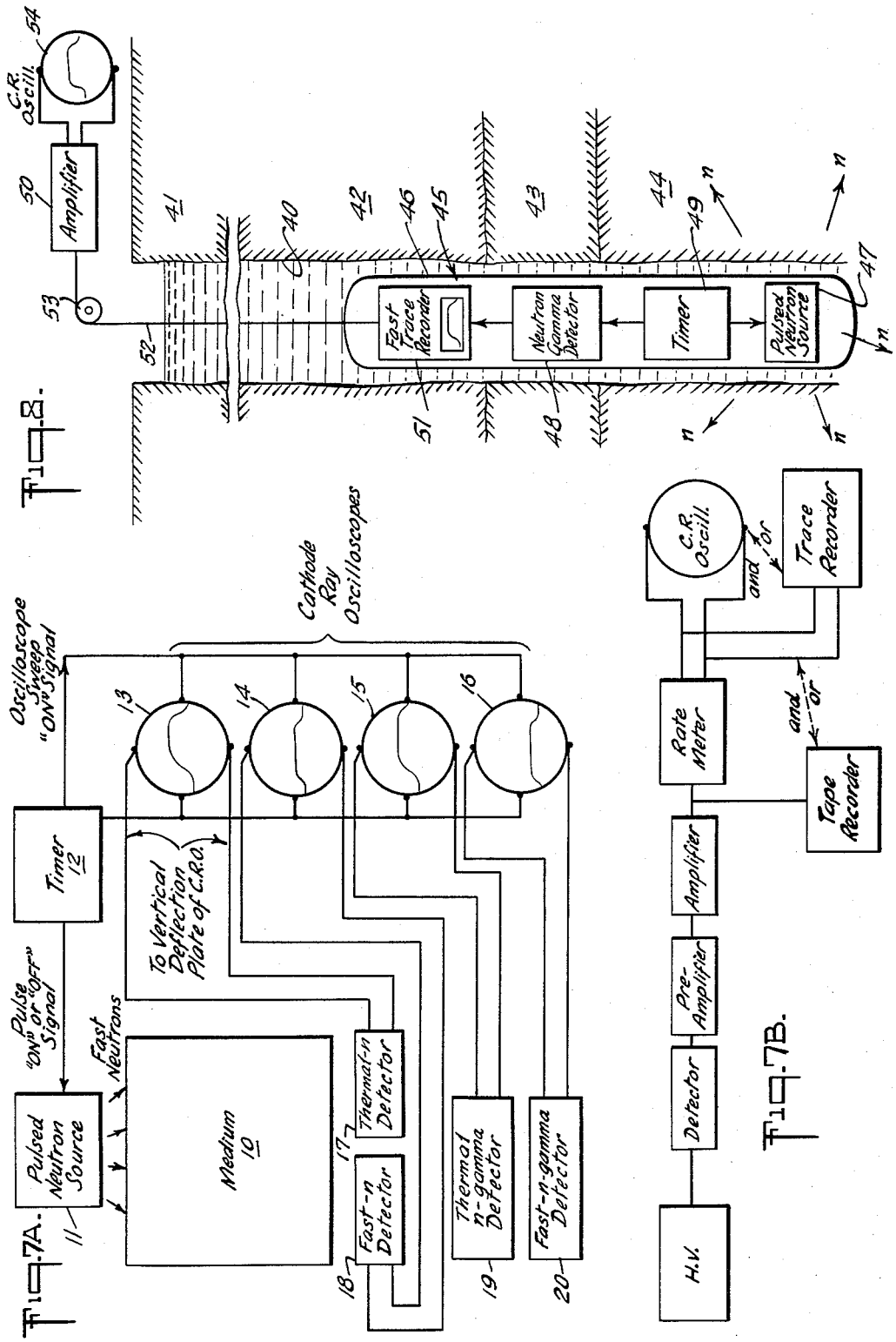

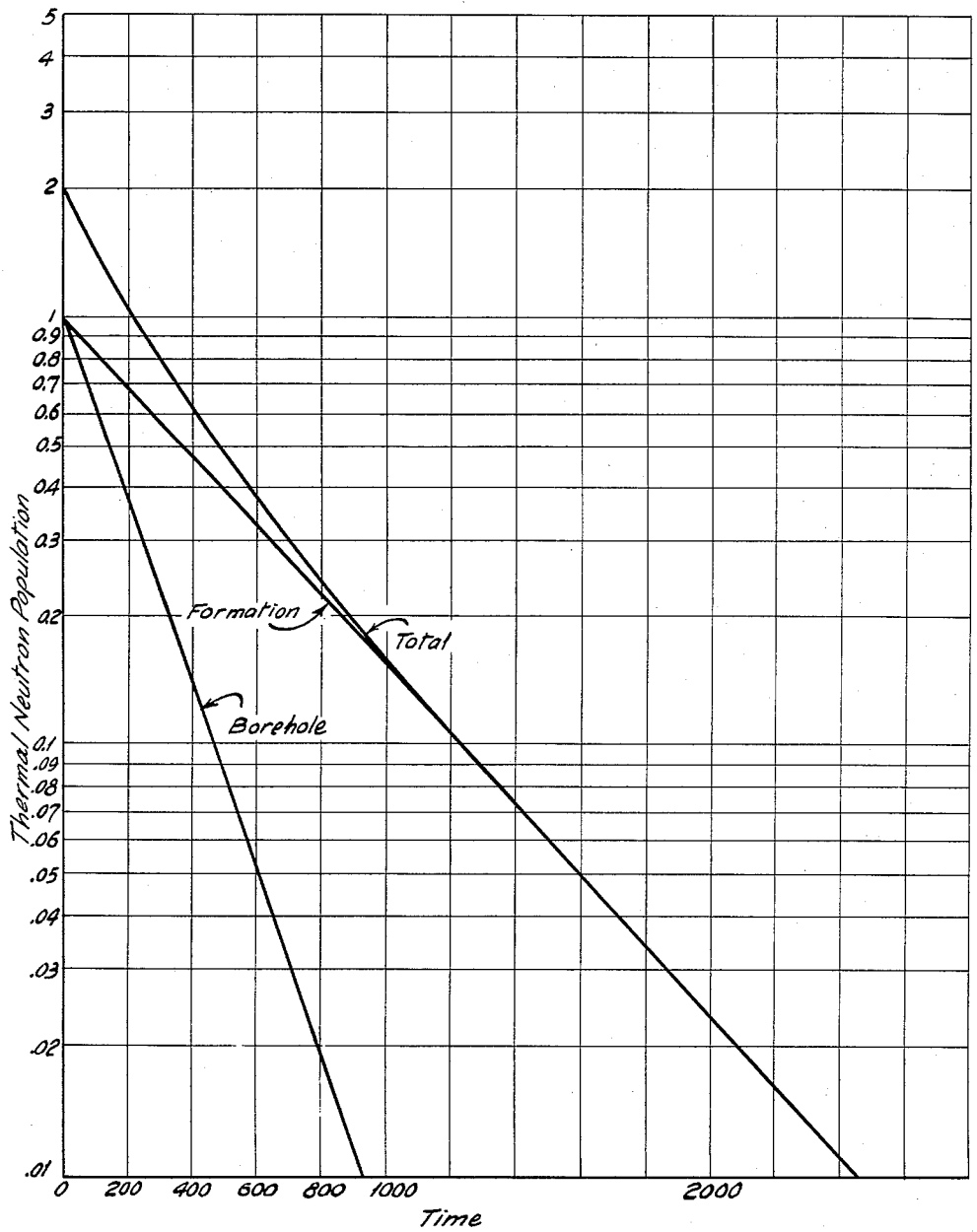

3,256,438
RADIOACTIVITY ANALYSIS OF A MEDIUM UTILIZING A PULSED NEUTRON SOURCE
Fontaine C. Armistead, Richmond, Va., assignor to Texaco Development Corporation, New York, N.Y., a corporation of Delaware
Filed Nov. 14, 1955, Ser. No. 546,736
7 Claims. (Cl. 250—83.6)

The present invention relates generally to the determination of certain properties of various media and, more particularly, the invention is concerned with irradiation of media and measurement of certain effects thereof to determine chemical and physical properties of the media. The invention is of particular utility as applied to the determination of certain characteristics of an earth formation traversed by a bore hole.

It is well-known to irradiate media in order to produce measurable radioactivity effects indicative of certain characteristics of the media. Such methods of investigation are commonly practiced in the logging of bore holes such as those employed in the oil well industry, and generally involve irradiation of the earth formation along the bore hole and measurement of the steady state radiation resulting therefrom in the form of induced radioactivity or scattered radiation. For example, oil well bore holes are often analyzed by means of neutron gamma-ray logs. These logs are obtained by passing a source of neutrons through the bore hole to irradiate the earth formation traversed thereby, thus producing induced gamma-rays which are then detected and plotted against bore hole depth as an indication of the nature of the constituents comprising the formation. While these conventional practices are quite valuable, nevertheless, it is often desirable to obtain comparable information by means of improved techniques or to obtain additional information not readily supplied thereby.

Accordingly, it is a general object of the present invention to provide an improved method of determining the characteristics of media.

It is a more specific object of the present invention to provide improved radioactivity analysis technique involving irradiation of media for determining the nature thereof.

It is still a more specific object of the invention to provide improved techniques of radioactivity analysis and may be carried on within a bore hole through an earth formation in order to determine the nature of the formation, thus providing useful information for locating petroleum and other mineral deposits in situ.

In general, prior art radioactivity analysis techniques are dependent upon the absolute value of the radioactivity measured. This dependency often imposes severe obstacles in the practical case since background radiation and other interferences often hamper accurate measurement of the radioactivity level.

Accordingly, it is another object of the present invention to provide improved radioactivity analysis techniques for determining the nature of media in a manner not dependent upon the absolute value of the intensity of the radiation.

In those cases where foreign matter is in the presence of media under investigation, the foreign matter may interfere with conventional radioactivity analysis techniques and thus limit their effectiveness.

Accordingly, it is still another object of the present invention to provide means for analyzing media in the presence of certain foreign matter in a manner which provides valuable information that is inherently separable from effects due to the foreign matter in the vicinity of the medium under investigation.

Conventional radioactivity analysis techniques employing a source of radioactivity to irradiate media to be investigated require heavy and cumbersome radiation shielding between the source of radiation and the detector. This poses a severe problem in many applications, especially where volume and weight of equipment should be kept to a minimum.

It is still another object of the present invention to provide a radioactivity analysis technique for determining characteristics of media by irradiation of the media which does not require a radiation shield between the source of radiation and detector.

It is another object of the invention to provide an improved method of radioactivity analysis for determining the presence of certain materials in an otherwise known medium.

It is another object of the invention to provide improved means for determining the salinity of a brine solution and which may be carried out while the solution under test is within a closed container.

It is still another object to provide an improved radioactivity analysis technique for monitoring the salinity of a brine solution flowing through a closed system.

It is still another object of the invention to provide an improved radioactivity analysis technique for determining the hydrogen-to-carbon atomic ratio of a pure hydrocarbon.

It is still another object of the invention to provide an improved method for determining the density or specific gravity of an earth formation which may be carried out with the formation in situ.

It is still another object of the invention to provide an improved method for determining the porosity of an earth formation which may be carried out with the formation in situ.

The present invention is concerned with nuclear radiation and particularly with the behavior of neutrons in various media. As is well-known, neutrons are electrically neutral, sub-atomic particles having a rest mass of the order of $1.675 \times 10^{-24}$ gm. These particles are normally considered as having a certain energy of motion as determined by their velocity, in accordance with well-known principles. In general, fast neutrons have an energy range of 1000 electron volts or higher and slow neutrons have an energy range below 1000 electron volts. For present purposes, neutrons that are slowed to a predetermined lower energy range are referred to as slow neutrons and those neutrons above the range are referred to as fast neutrons. The predetermined lower range may be determined by the energy threshold of the detector employed to measure them. Neutrons within the lower end of the slow neutron range are referred to as thermal neutrons. Thermal neutrons have an average energy of the order of 0.025 electron volt at room temperature. At the temperature found in a conventional oil well bore hole, however, on the order of 100° C., the energy of thermal neutrons is on the order of 0.032 electron volt. When fast neutrons are sent into a medium they are slowed down, ultimately to the thermal velocity or energy range, as a result of many atomic collisions, thereby reducing the fast neutron population in the medium, but introducing a slow neutron population. The slowed down neutrons travel about in the manner of diffusing gas molecules and undergo many more collisions. After a time interval, the slowed neutrons are captured by various atoms of the medium and thus removed from circulation. This capture is accompanied by the emission of nuclear radiation by the capturing atom, including a penetrative portion which in general comprises gamma radiation and which may be measured by an appropriate detector. Neutrons slowed to the thermal range represent a specific case of slow neutrons. The majority of slow neutron captures occur with neutrons at the thermal level.

The invention is particularly concerned with certain time-dependent effects exhibited by neutrons in a medium as they are slowed from the fast to the slow ranges and thereafter captured. Specifically, neutrons in a medium are slowed down from fast neutrons to slow neutrons at a rate characteristic of the medium and, furthermore, the slow neutrons thus produced are thereafter captured at a rate, different from the slowing down rate, but also characteristic of the medium. The characteristic time for slowing neutrons from fast to slow is called the "slowing down time," symbolized as $T_s$, and the characteristic time for capturing the slowed down neutrons, which may be thermal neutrons in many cases, is referred to as the lifetime against capture" or simply the "capture time," symbolized as $T_c$.

Briefly stated, in accordance with one aspect of the present invention, a medium to be investigated is irradiated with nuclear radiation in such a manner that an abrupt change in the irradiation rate is produced, subsequently, radiation emanating from the media under investigation is detected during a predetermined interval of time. More particularly, one aspect of the invention contemplates irradiation of a medium with neutrons in such manner as to produce an abrupt change in the neutron source rate, thereupon, radiation emanating from the media is detected and measured as an indication of the rate of change of the neutron population density in the media. Preferably, this radiation is detected only during a brief interval after an abrupt change in source rate. Accordingly, radiation is detected only during the time that the rate of production of neutrons from the source is not equal to the rate of absorption of neutrons in the media and during such time either or both the neutron slowing down time and the neutron capture time may be deduced from neutron population density measurements.

Thus, in accordance with the principles of the invention, the medium under investigation is irradiated in a manner calculated to produce either or both neutron slowing down and neutron capture effects, either or both of which are observed as means for identifying a specific substance responsible for either or both the slowing down and the capture.

One phase of the invention contemplates determination of either or both neutron slowing down and capture times directly as displayed by fast neutrons and slow neutrons, respectively. Another phase of the invention contemplates determination of either or both neutron slowing down and capture times indirectly as displayed by fast neutron gammas and slow neutron gammas, respectively. Various modifications of the invention are concerned with combinations of these techniques.

One application of the invention resides in its utility as a technique for logging a bore hole, in which case the invention contemplates passing a neutron source through a bore hole, irradiating the formation in a manner characterized by an abrupt change in source rate and detecting the radioactivity effect produced thereby during a predetermined time after the abrupt change.

Although the foregoing discussion is concerned with the build-up of the fast and slow neutron population densities upon starting the neutron source, it is pointed out that a similar but reverse behavior occurs upon stopping the neutron source. Whereas in the first instance rates of neutron density rise are indicative of certain characteristics of a medium, analogous characteristics affect the rates of fast and slow neutron density decay. These decay rates may be determined by abruptly reducing the irradiation rate and detecting radiation emanating from the media in a manner comparable to that employed in the determination of the rise rates, e.g., by irradiating the media for a predetermined time of sufficient duration to establish the steady-state condition, i.e., until the rate of absorption of neutrons by the media equals the rate of production of neutrons by the source, then abruptly turning off the source and detecting the radiation emanating from the media as it decays from the steady-state condition to a predetermined value, usually zero or some other comparable steady-state condition.

The true significance of the present invention may be better realized when it is recalled that neutron irradiation analysis, such as neutron for oil wells, for example, are performed with substantially a steady-state condition for the particular medium under investigation. In accordance with the present invention, on the other hand, it is contemplated to employ a source of neutrons characterized by an abrupt change in irradiation ratio and, in particular, it is preferred to employ a neutron source capable of pulsed, on-off, operation. Radiation measurements are made of the neutron population density only during a transient condition, i.e., when the neutron population densities are either building-up or decaying.

For additional objects and advantages, and for a better understanding of the invention, attention is now directed to the following detailed description and accompanying drawing. The features of the invention which are believed to be novel are particularly pointed out in the appended claims.

In the drawings:

FIGURE 1 is a graph showing the neutron capture time $T_c$ and the neutron slowing down time $T_s$ for certain materials encountered in earth formation;

FIGURE 2 is a graph showing the neutron slowing down time $T_s$ and the neutron capture time $T_c$ in various porosity sandstones filled with water and an average brine;

FIGURE 3 is a graph showing the thermal neutron capture time $T_c$ in porous sandstone filled with brine of various concentrations;

FIGURE 6 is a graph showing the variation with time of (B) the fast neutron population, (C) slow neutron population, (thermal range) and (D) the rate of production of capture gammas, all of which result from (A) a 500 microsecond burst of fast neutrons.

FIGURE 7a is a block diagram illustrating apparatus which may be employed in the practice of the present invention;

FIGURE 7b is a block diagram illustrating in greater detail each detector portion of the apparatus of FIGURE 7a.

FIGURE 8 is a diagram, partly in block form, illustrating apparatus for use within an earth bore hole to analyze the formation traversed by the hole;

FIGURE 9b is a graph showing the total and the separate effects of a typical earth formation and contents of a typical bore hole upon the rate of change of slow neutron population density (thermal range) following such a burst of fast neutrons as described in 9a;

FIGURE 10 is a graph showing the total and the separate effects of a typical earth formation and contents of a typical bore hole upon the rate of change of slow neutron population density, (thermal range) as given in FIGURE 9b, but plotted semi-logarithmically to simplify interpretation;

Figure 11:
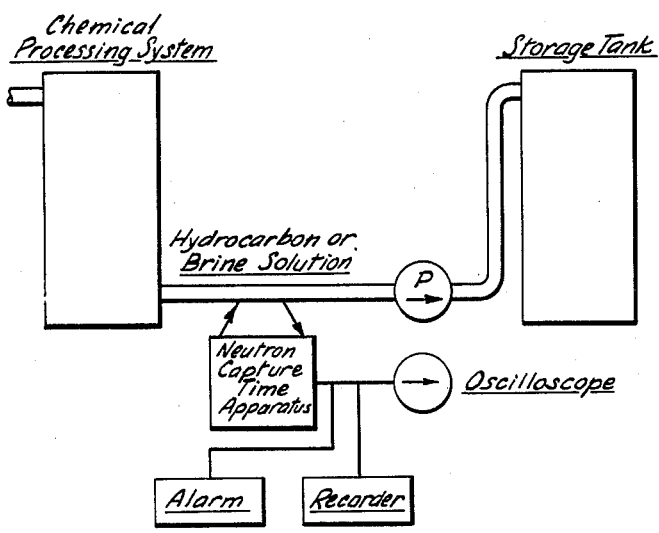
Figure 12:
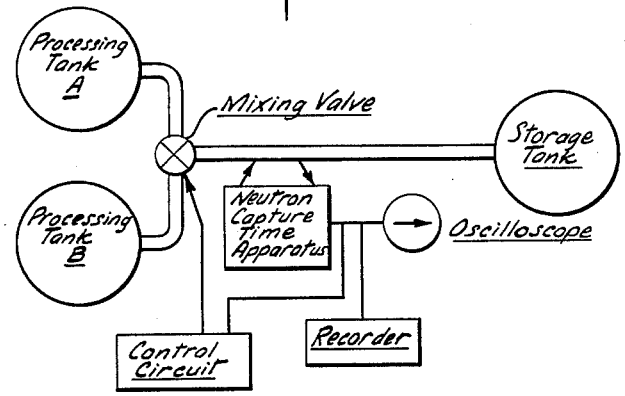

FIGURE 11 is a block diagram illustrating equipment for monitoring the hydrogen-to-carbon atom ratio or brine salinity of material in a chemical system, or the like, in accordance with principles of the invention; and, FIGURE 12 is a block diagram of apparatus similar to that of FIGURE 11, wherein a monitor in accordance with the invention is employed to control a mixing valve in order to maintain a desired concentration of the fluid under observation.

POPULATION DENSITY OF FAST NEUTRONS

Let us first consider the effect of irradiating a medium with fast neutrons emitted from a source capable of being turned on and off abruptly. When the source of neutrons is first turned on, the number of fast neutrons permeating the medium rises from zero to some equilibrium value which is determined by the nature of the medium. The rate of rise of fast neutrons in the medium is affected not only by the rate of rise of fast neutrons emitted by the source, but also by the rate of loss of fast neutrons by slowing down due to characteristic properties of the medium. After the fast neutron source has been on for a time long compared to the slowing down time of the medium the population density of fast neutrons levels off at an equilibrium value such that the rate of loss of neutrons from slowing down exactly equals the gain of new neutrons from the source. Assuming a source of fast neutrons having a substantially zero time rise to its maximum value, e.g., a substantially rectangular waveform burst of neutrons, we can then consider the fast neutron population changes as determined entirely by the slowing down of neutrons, which, in turn, is determined by the medium under irradiation.

The characteristic slowing down time $T_s$ for fast neutrons in a medium is governed by the presence of relatively light chemical elements and is, in fact, determined substantially altogether by the concentration of the element hydrogen, the lightest of the elements. Particularly as applied to the analysis of an earth formation, a measurement of neutron slowing down time $T_s$ affords means for determining the concentration of oil and water therein due to the hydrogen contained in these components.

By way of example, it has been determined that a hydrogenous medium slows down fast neutrons rapidly and, hence, after turning on a source in such a medium the density of fast neutrons rapidly rises to its equilibrium value. Similarly, and by contrast, it has been determined that a dry sand slows down neutrons relatively slowly and, hence, the density of fast neutrons rises slowly to its equilibrium value in such a medium.

POPULATION DENSITY OF SLOW NEUTRONS

Considering another aspect of the invention, it has been discovered that the population density of slow neutrons rises to its equilibrium value in a manner dependent upon both the rate at which the medium converts fast neutrons to slow neutrons and the rate at which the medium captures the slow neutrons and removes them from circulation. As far as the slow neutron population is concerned, the conversion of fast neutrons to slow neutrons by slowing down constitutes the birth of slow neutrons and the capture of slow neutrons constitutes their death. In the first moment after the source of fast neutrons starts, the birth rate of slow neutrons exceeds their death rate and the slow neutron population density rises in a way determined by two constants of the medium, namely, the neutron slowing down rate and the slow neutron capture rate. After the source of fast neutrons has been on for a time long compared to the slow neutron capture time, the population density of slow neutrons levels off at a value such that the death rate by capture equals the birth rate by slowing down.

The characteristic neutron capture time $T_c$ of the medium is governed by the presence of elements which capture slow neutrons readily. The determining factor is the product of the concentration of the high capture element by its slow neutron "capture cross section."

Some important capturing elements in earth formation, along with their capture cross sections, are given in Table I. This table also includes data on certain weakly capturing elements, viz., carbon and oxygen, in order to illustrate their relative ineffectiveness despite their abundance in the media with which we are concerned.

Table I

| Element: | Capture cross Section ($10^{-24}$ cm.$^2$) |
|---|---|
| H | 0.33 |
| Li | 67. |
| B | 750. |
| Na | 0.49 |
| Al | 0.215 |
| Si | 0.13 |
| Cl | 31.6 |
| K | 1.97 |
| Ca | 0.43 |
| Ti | 5.6 |
| Cr | 2.9 |
| Mn | 12.6 |
| Fe | 2.43 |
| and for comparison | |
| C | 0.0045 |
| O | <0.0002 |

The effectiveness of certain elements in controlling neutron capture time, $T_c$, is illustrated below in Table II.

Table II

| Formation | Some neutron capturing elements | Atomic concentration in the formation | Percent of all captures occurring in each element |
|---|---|---|---|
| Igneous Rock | Si | 20.4 | 14 |
| | K | 1.4 | 7 |
| | Fe | 1.9 | 10 |
| | H | 2.7 | 4.7 |
| Shale | B | 0.05 | 70 |
| | Fe | 1.6 | 7 |
| | H | 10.2 | 6 |
| Sandstone | B | .002–.005 | 12–33 |
| | Si | 25.4 | 34–26 |
| | H | 3.5 | 12–10 |
| Limestone | Ca | 14.6 | 68 |
| | Li | 0.007 | 5 |
| | B | 0.0005 | 4 |
| | H | 1.7 | 6 |
| Sediment | B | 0.04 | 70 |
| | Fe | 1.4 | 7 |
| | Si | 18.5 | 5 |
| | K | 1.2 | 5 |
| | H | 6.9 | 5 |

METHOD OF CALCULATION OF $T_s$ AND $T_c$

The "slowing down time," $T_s$, for fast neutrons and the "capture time," $T_c$, for the slow, i.e., slowed-down neutrons, can be calculated in a given medium from the following formulas:

$$T_s = \frac{\bar{l}_s}{\bar{z}}\sqrt{2m}\left(\frac{1}{\sqrt{E_F}} - \frac{1}{\sqrt{E_I}}\right)$$

where $\bar{l}_s$ is the average mean free path for scattering of neutrons
$\bar{z}$ is the average logarithmic energy loss per collision, related to the atomic weight by the equation:

$$z = 1 + \frac{(A-1)^2}{2A}\log_e\frac{A-1}{A+1}$$

$m$ is the neutron mass
$E_I$ and $E_F$ are the initial and final neutron energies.

For practical purposes this equation becomes:

$$T_s = 1.06 \times \frac{(\text{Sum of } fA) \text{ microseconds}}{(\text{Sum of } fS_s)(\text{Sum of } fz)(\text{density of mixture})}$$

where

Sum of any term means the summation of all the terms of this kind for the individual components of a mixture $f$ is the mole fraction of a constituent, e.g., $f=0.67$ for H in $H_2O$ $A$ is the atomic weight of a constituent $S_s$ is the neutron scattering cross section for a constituent, in barns ($10^{-24}$ cm.$^2$)

$z$ is the log energy loss per collision, same as $\bar{z}$ above

Density is in gm./cc.

$$T_c = \frac{(\text{Sum of } fA)}{NV(\text{Sum of } fS_c)(\text{density of mixture})}$$

where $f$ and $A$ have same meaning as above $N$ is Avogadro's number $0.602 \times 10^{24}$ atoms/mole $v$ is velocity of thermal neutrons ($2.2 \times 10^5$ cm./sec.)

$S_c$ is neutron capture cross section for any constituent (barns) or for practical purposes:

$T_c =$ $$7.6 \times \frac{(\text{Sum of } fA)}{(\text{Sum of } fS_c)(\text{density of mixture})} \text{ microseconds}$$

CALCULATED VALUES OF $T_s$ AND $T_c$

Some actual values of $T_s$ and $T_c$, calculated from the formulas, for various media met with in oil well logging and also for several media of a more general nature such as it may be desired to analyze in general chemical work, are given in Table III.

*Table III (all times in microseconds)*

| Medium | $T_s$ | $T_c$ |
|---|---|---|
| Water or oil* | 0.32 | 205 |
| Barite mud | 0.38 | 209 |
| Av'g Igneous Rock, sp. gr. 2.70 | 14.2 | 306 |
| Av'g Shale SG, 2.65 | 5.1 | 95 |
| Av'g Sandstone: | | |
| SG, 2.14; porosity, 19% | 14.7 | 635 |
| SG, 2.25; porosity, 15% | 14.0 | 603 |
| SG, 2.36; porosity, 11% | 13.4 | 578 |
| Av'g Limestone: | | |
| SG, 2.68; porosity, 4% | 10.6 | 585 |
| SG, 2.72; porosity, 3% | 10.5 | 578 |
| SG, 2.76; porosity, 1.4% | 10.3 | 570 |
| Av'g Sediment SG 2.65 | 7.3 | 114 |
| Av'g Sandstone, water-filled, porosity: | | |
| 11% | 4.62 | 442 |
| 15% | 3.60 | 423 |
| 19% | 2.86 | 405 |
| Av'g Limestone, water-filled, porosity: | | |
| 3% | 7.75 | 532 |
| 15% | 3.50 | 451 |
| Av'g Sandstone 15% por., filled with: | | |
| 10% conc. brine | 3.67 | 366 |
| 15% conc. brine | 3.70 | 344 |
| 20% conc. brine | 3.73 | 324 |
| 25% conc. brine | 3.73 | 307 |
| 30% conc. brine | 3.77 | 292 |
| Av'g Sandstone filled with 20% conc. brine, and having: | | |
| 11% poros | 4.79 | 359 |
| 15% poros | 3.73 | 324 |
| 19% poros | 3.02 | 296 |
| Brine: | | |
| 10% conc | .328 | 137 |
| 15% conc | .331 | 117 |
| 20% conc | .335 | 103 |
| 25% conc | .338 | 91.8 |
| 30% conc | .342 | 83.3 |
| $CCl_4$ (Carbon tet.) | 20.4 | 5.78 |
| $CCl_2F_2$ (Freon 12) | 20.9 | 9.69 |
| $CCl_3F$ (Freon 11) | 21.0 | 7.35 |
| $CHCl_2F$ | 3.61 | 8.80 |
| H/C ratio (Hydrocarbon of SG 0.70): | | |
| 1.000 | | 423 |
| 1.250 | | 346 |
| 1.500 | | 293 |
| 2.000 | | 228 |
| 3.000 | | 164 |
| 4.000 | | 131 |

*Note.—throughout this table it should be understood that "water" means "water or oil". They are indistinquishable by the present means.

Note.—all $T$ values for sandstone are plus or minus 13% for the range of boron content.

The chemical composition assumed in calculating the time constants of the various earth formations are derived from Rankama and Sahama, Geochemistry, University of Chicago Press, 1950, especially page 226, and from Brian Mason, Principles of Geochemistry, John Wiley and Sons, 1952, especially page 130. Due account is taken of the trace quantities of those elements such as lithium, boron, cadmium, indium, mercury and others which are extraordinarily effective in capturing neutrons.

USEFUL INFORMATION GAINED FROM TIME CONSTANTS

IDENTIFICATION OF CHEMICAL COMPOUNDS

By measuring the neutron slowing down time $T_s$ and neutron capture time $T_c$ certain chemical compounds may be determined by correlation with data, such as that given in Table III for halogenated hydrocarbons, freons, etc. Additional time constants, both $T_s$ and $T_c$ may be calculated as desired by the method of calculation given above. The slowing down time $T_s$ and the neutron capture time $T_c$ may be measured separately or at the same time as outlined in the section below entitled Determination of Time Constants. In certain instances, it is considered desirable to determine the ratio of the two time constants, $T_s$ and $T_c$, for correlation with the ratio determined or calculated for known constituents. A particular embodiment of this technique resides in the identification of earth formations.

IDENTIFICATION OF EARTH FORMATIONS

Measurements of neutron slowing down time $T_s$ and capture time $T_c$ made along a bore hole, for example, afford means for determining the nature of the formations traversed by the bore hole when correlated with data such as that of Table III. Some of the salient features of the data of Table III are summarized in graphical form in FIGURES 1–5. FIGURE 1 shows how each of several types of earth formation has a distinct pair of time constants by which it could be recognized. For example, if measurements indicated a neutron slowing down time $T_s$ of 14 microseconds (millionths of a second), and a slow neutron capture time $T_c$ of 300 microseconds (considering slow neutrons to be in the thermal range for this example), the indication is that the formation is igneous rock. If the pair of time constants had been 14 and 600, however, the indication would be dry sandstone. Again, if the pair of time constants had been 3 and 300, the indication would have been a brine-filled sandstone.

HIGH CAPTURE ELEMENT ASSAY

High-capturing elements can also be detected in an otherwise known medium by their effect on $T_c$. Consider data of Table IV, where the listed concentration of each element would alone be sufficient to reduce the capture time in average earth material or in water by one half. In chemical analysis of the contents of a vessel, e.g., one may be monitoring for the appearance of a small amount of a known or suspected contaminant, say lithium. Then $T_c$ would be a sensitive indicator of the contaminant.

In accordance with one aspect of this feature of the invention, suitable time dependent apparatus may be positioned adjacent a conduit in a chemical system in order to monitor material flowing through the conduit in order to determine the presence or absence of a suspected contaminant which may be contained in the material flowing through the conduit. Such a monitor may be employed to control an alarm mechanism or to operate a valve in order to control the flow pattern of the chemical system as determined by either or both the nature and the concentration of the contaminant. This technique of monitoring a chemical system may be carried on in a manner similar to that discussed below with regard to the monitoring of a brine solution and may likewise include the making of a continuous record of the suspected or known contaminant.

By way of further illustration of capture-assay, in drill hole prospecting one might have reason to expect mercury in a certain location, but not to expect any other of the high-capture elements; then a decrease in $T_c$ would indicate a mercury deposit. Gold and silver could likewise be found.

In addition to the aforementioned direct method for determining the presence of a suspected high capture element in a given media, it is further contemplated in accordance with the invention to analyze a medium for the presence of other suspected elements by their known or suspected association with elements having a detectable capture cross section.

Thus, one could use $T_c$ to locate a desired ore by the chemical company it keeps. For example, zinc is not a high-capture element, but cadmium and indium are, and they are often found with zinc. Therefore one could find zinc by logging with $T_c$ for cadmium and indium.

*Table IV.—Atomic percent of high capture elements which would reduce capture time in average earth material or water by half*

| Element | Percent | Element | Percent | Element | Percent |
|---|---|---|---|---|---|
| Li | 0.5 | Mo | 13 | Tb | 3.3 |
| B | 0.05 | Rh | 0.2 | Dy | 0.03 |
| Cl | 1.0 | Pd | 5.5 | Ho | 0.6 |
| K | 16 | Ag | 0.6 | Tm | 0.3 |
| Sc | 1.5 | Cd | 0.01 | Lu | 0.2 |
| Ti | 7.6 | In | 0.17 | Hf | 0.3 |
| V | 7 | Sb | 7 | Ta | 1.6 |
| Cr | 13 | Te | 8 | W | 1.8 |
| Mn | 2.5 | I | 5 | Re | 0.4 |
| Fe | 18 | Cs | 1.3 | Os | 2 |
| Co | 1 | La | 4 | Ir | 0.07 |
| Ni | 7 | Ce | 5.5 | Pt | 4 |
| Cu | 11 | Pr | 3.3 | Au | 0.3 |
| Ge | 12 | Pm | 0.6 | Hg | 0.08 |
| As | 8 | Sm | 0.004 | U | 4.5 |
| Se | 2 | Eu | 0.006 | | |
| Br | 5 | Gd | 0.0008 | | |

QUANTITATIVE ANALYSIS

While the preceding embodiments of the present invention have been concerned primarily with qualitative analysis, further aspects pertain to quantitative analysis employing principles of the invention. The neutron capture time $T_c$ affords means for determining the concentration of a known component in an otherwise constant medium. For example, by reference to FIGURES 3 and 4 and Table III it is seen that this technique may be applied to the determination of the salinity of brine in briny earth formations. By reference to FIGURE 5 and Table III, it may be seen that this technique may be applied to the hydrogen-to-carbon atomic ratio of pure hydrocarbons.

SALINITY INDICATOR

In accordance with one aspect of the invention, either a closed or open container filled with a brine solution may be quantitively analyzed by irradiation of the brine solution and measurement of the neutron capture time $T_c$ as affected by the concentration of the brine solution.

One embodiment of this feature resides in the repetitive use of this technique to monitor a brine solution flowing through a closed system. Such may be accomplished by repetitively irradiating the brine in the system, or a sample of the brine as by means of a bypass conduit, and determining the time constant $T_c$ at predetermined intervals. Known electronic or mechanical timing devices may be employed for controlling such a monitor in accordance with a desired sampling interval as related to the flow rate of the brine and the expected rate at which the salinity will vary from a given value. A further refinement of this embodiment may include an alarm device for warning an operator or automatic control means for applying a correction, as by controlling a mixing valve when the brine has deviated from a desired range of salinity. A continuous record of the brine content may be made by connecting a suitable recorder to the output of the detector apparatus.

As applied to the analysis of an earth formation, $T_s$ provides an indicator of the porosity of formation, which is relatively insensitive to the salinity, as shown in FIG. 1. By determining $T_c$ in combination with $T_s$, the salinity of the contained brine may be obtained together with the porosity as shown in FIG. 1.

INDICATOR OF HYDROGEN-TO-CARBON ATOMIC RATIO

It has further been determined that the capture time $T_c$ provides an indication of the hydrogen-to-carbon atomic ratio of pure hydrocarbon. One embodiment of the invention comprises determining the effect on capture time of a selected hydrocarbon either in an open or closed container. The technique employed may be similar to the case of a closed brine filled system. Likewise, a similar technique may be employed to monitor an enclosed hydrocarbon system as a continuous indicator of the hydrogen-to-carbon atomic ratio from time to time.

DENSITY INDICATOR

Another factor determining the values of the neutron time constants in an earth formation is the formation density or specific gravity. Both $T_s$ and $T_c$ vary inversely with density. FIGURE 1 indicates the range of time constant values corresponding to typical ranges of densities in dry sandstones and dry limestones. The sandstone data are further spread out, as shown in FIG. 1, by a substantial variability in the boron content of sandstone (9–31 parts per million by weight, according to Mason, cited above).

POROSITY INDICATOR

It has been determined that the neutron slowing down time $T_s$ is a good indicator of the porosity of an earth formation, regardless of the chemical nature of the formation or of the fluids in the formation. Such fluids as are found in earth formations generally comprise water or oil, both of which are rich in hydrogen atoms which have a substantial effect upon $T_s$. Thus, the porosity indication may be obtained indirectly as a function of the quantity of such fluids permeating the formation. By way of example, note in FIGURE 1 how close to the same value all the 15% porosity values for $T_s$ fall, in water and brine-filled sandstone, with brines of various salinity, and also in a hypothetical 15% porous water-filled limestone. Porosity data are shown in more detail in FIGURE 2, where it will be seen that the curves for $T_s$ vs. porosity are nearly the same for water-filled and for brine-filled sandstone over a great range of porosities, although the $T_c$ data differ substantially. It should be noted that the term "water-filled" means "water or oil filled," since water and hydrocarbon oil are indistinguishable by these means.

COMPUTATION OF TIME DEPENDENT EFFECTS

The way in which neutron population density varies with time upon starting and stopping the neutron source can be expressed in terms of the above-discussed time constants. Thus, where $k_1 = 1/T_s$ and $k_2 = 1/T_c$ BUILD UP, upon turning on source of strength S neut./sec.:

$$\text{Fast neutron population} = \frac{S}{k_1}(1 - e^{-k_1 t})$$

(Eq. 1)

$$\text{Slow neutron population} = \frac{S}{k_2} \frac{(k_2(1-e^{-k_1 t}) - k_1(1-e^{-k_1 t})}{k_2 - k_1}$$

(Eq. 2)

DECAY, upon turning off source, after it has been on at least 3 times $T_c$:

$$\text{Fast neutron population} = \frac{S}{k_1} e^{-k_1 t}$$

(Eq. 3)

$$\text{Slow neutron population} = \frac{S}{k_2} \frac{k_2 e^{-k_1 t} - k_1 e^{-k_2 t}}{k_2 - k_1} \quad \text{(Eq. 4)}$$

These equations are plotted in FIGURE 6, showing how the neutron populations and the neutron gamma rate vary with time in a fictitious example. Curve A shows the source coming on suddenly at full strength at $t=0$ and going off suddenly at $t=500$. Curve B shows the fairly rapid build-up of the fast neutron population to its equilibrium level upon starting the source and the equally rapid decay upon stopping the source. Curve C shows the more complex build-up and decay of the thermal neutron population. Note that Curve C shows the exponentially controlled rise and decay shapes, just as Curve B does, with the one exception that C gets off to a delayed rise and also a delayed decay. It is useful to note that this delay is determined by $T_s$. In fact Equations 2 and 4 are very closely approximated over most of their range by a pure exponentially controlled rise and decay curve, of single time constant, $T_c$, provided they are plotted as if starting to rise at $t=T_s$ instead of at $t=0$, and as if starting to decay at $t=500$ plus $T_s$ instead of at $t=500$. Thus, upon observing such a curve as C, one is able to deduce $T_s$ and $T_c$ simply by inspection. $T_s$ is the delay before the C-curve begins to assume a pure exponential shape, and $T_c$ is the time thereafter before the C-curve is within $1/e$ (i.e. $1/2.718$) of its final value.

Curves B and C give neutron population, a quantity which would be measured directly by use of fast and thermal neutron detectors. However, if we measure thermal neutron-induced gammas we must expect something different. The shape of the gamma rate plotted against time must of course resemble the thermal neutron curve, C, but the height of the curve, that is, the ordinate values, will not be the same. As a matter of fact the ultimate value for the gamma rate curve—see Curve D—has to be equal to $n \times S$, the number of gamma rays released per captured neutron times the number of neutrons per unit time released into the medium, and $n$ is nearly the same for all neutron capturing materials. Therefore the $n$-gamma curve, D, shows the same time behavior as the thermal neutron population curve, C, but does not depend on the constant, $k_2$, as does Curve C, for the height to which it rises before leveling off. This comes about from the fact that ultimately the neutron capture rate must equal the neutron production rate, regardless of any time factors.

Another way of showing why this is so is as follows. Suppose Curve C were plotted again, this time for $T_c = 200$, and $k_2 = .005$. Now with thermal neutrons able to escape capture for twice as long as before, the population will level off at twice the previous magnitude. Equation 2 shows this by having $k_2$ in the denominator. The neutron capture rate would be twice as great as before, since the neutron population is twice as great, but this increase is exactly compensated for by the fact that the medium allows the neutrons to live twice as long before capture. The net effect then is that the neutron capture rate, and hence the gamma production rate, is unchanged by a change in $T_c$ (or in its reciprocal, $k_2$).

Thus Curve D represents the time dependence of the thermal neutron capture gamma rate, which might be formulated thus:

BUILD-UP:

Thermal neutron capture gamma rate =

$$nS \frac{k_2(1 - e^{-k_1 t}) - k_1(1 - e^{-k_2 t})}{k_2 - k_1} \quad \text{(Eq. 2')}$$

DECAY:

Thermal neutron capture gamma rate =

$$nS \frac{k_2 e^{-k_1 t} - k_1 e^{-k_2 t}}{k_2 - k_1} \quad \text{(Eq. 4')}$$

where $n$ is the number of gamma rays released per neutron capture.

In many applications the flux of neutron-induced gammas would be a preferable quantity to measure, rather than the neutron population density, since the gamma flux can be measured at a point remote from the medium, whereas the neutron population density is ordinarily measured directly in or adjacent to the medium. Accordingly, in order to measure the neutron slowing down time and neutron capture time, one need but observe the time rates of change of the appropriate gamma-ray fluxes since these fluxes faithfully reflect the neutron densities. Thermal neutrons are the principal source of induced gamma-rays and therefore $T_c$, which is the thermal neutron capture time, is readily obtained from thermal neutron induced gammas, however, there are also characteristic gamma-rays induced by fast neutrons, particularly those generated by neutrons undergoing inelastic scattering in the process of slowing down.

Accordingly, the present invention contemplates analysis of a medium through the detection and the measurement of the characteristic gamma-rays induced not only by thermal neutrons, but also by fast neutrons. Very fast neutrons undergoing inelastic scattering in the process of slowing down in a medium emit appreciable quantities of gamma rays having a characteristic energy spectrum of lower energy range than the impinging neutrons. Gamma rays thus produced may be selectively detected as an indication of fast neutron population density in the medium. For example, appreciable quantities of 4.4 mev. gamma rays are emitted by carbon, 6.1 mev. gamma rays by oxygen, and 0.85 mev. gamma rays by iron when neutrons of initial energies greater than these respective gamma ray energies are being slowed down in the presence of carbon, oxygen and iron. (L. C. Thompson and J. R. Risser, "Physical Review," vol. 94, page 941, 1954; also Kiehn and Goodman, "Physical Review," vol. 93, page 177, 1954.)

In accordance with the foregoing, one technique for the analysis of a medium comprises irradiation of the medium with a source of fast neutrons characterized by an abrupt change in irradiation rate and having an energy range in excess of a predetermined value, namely, the characteristic emission range of the element suspected and subsequently detecting fast neutron-induced gammas emanating from the medium by means of a detector that is tuned to the said predetermined energy value, thereby to observe the fast neutron population density. Observation of the rate of change of this fast neutron-induced gamma flux with time yields the desired time constant, $T_s$.

ACTUAL DETERMINATION OF TIME CONSTANTS

There are several methods of determining the time constants $T_s$ and $T_c$ in practice. In most simple chemical analysis of a medium, where there is no problem of mixed responses due to the presence of foreign matter in the immediate vicinity of the medium of interest, $T_s$ and $T_c$ can be observed directly in the time dependent neutron and neutron gamma behavior of the medium. However, in cases where the medium of interest is surrounded or permeated with foreign matter or capable of producing time dependent effects, the actual response observed in the time dependent neutron analysis (either fast or slow, and either neutron or neutron gamma) will be the composite response of the medium of interest and of the foreign matter. Such problems exist, for example, in cases where the medium of interest is surrounded by either or both oil and water.

In many cases, certain means are available for separating the contributions of the desired medium and foreign matter so that information on the medium of interest can be obtained. For example, when the foreign matter has a very short $T_s$ as compared with that of the medium of interest, one can measure $T_s$ alone and can measure it substantially free of effects due to foreign matter by observing fast neutrons or fast neutron gammas after the slowing down effect due to the foreign matter has occurred. By way of illustration, this may be accomplished by rendering the detector inoperative for the first few microseconds after the source is turned on until several times the time $T_s$ for foreign matter has elapsed. Thus, if an abrupt change is produced in the source rate, the interval of time $T_1$ immediately thereafter during which the slowing down effect due to the foreign matter occurs may be disregarded by maintaining the detector inoperative. Thereafter, the detector may be operated during a subsequent interval of time $T_2$ and while the slowing down effect due to the desired media is still going on. Conversely, the slowing down effect due to a medium having a short $T_s$ compared with foreign matter having a relatively long $T_s$ may be obtained by detecting radiation only during the first few microseconds after the source is turned on and ignoring subsequent radiation indicative of $T_s$ for the foreign component having the longer time constant.

Figure 4:
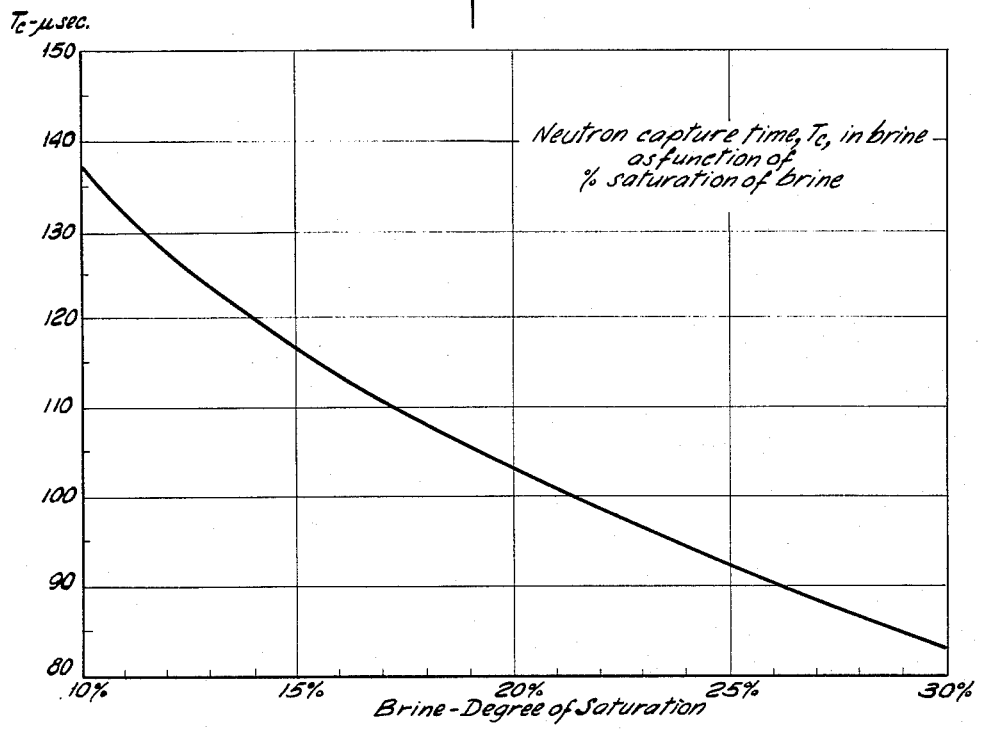
FIGURE 4 is a graph showing the thermal neutron capture time $T_c$ in brine as a function of the percent of saturation of the brine.
Figure 5:
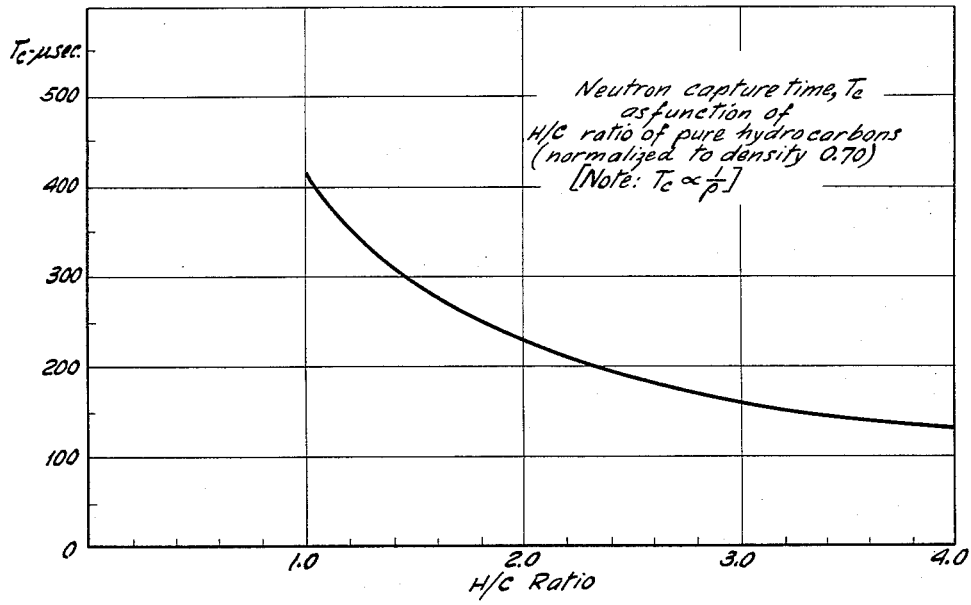
FIGURE 5 is a graph showing the neutron capture time $T_c$ as a function of the hydrogen-to-carbon atomic ratio of pure hydrocarbons.
Figure 9A:
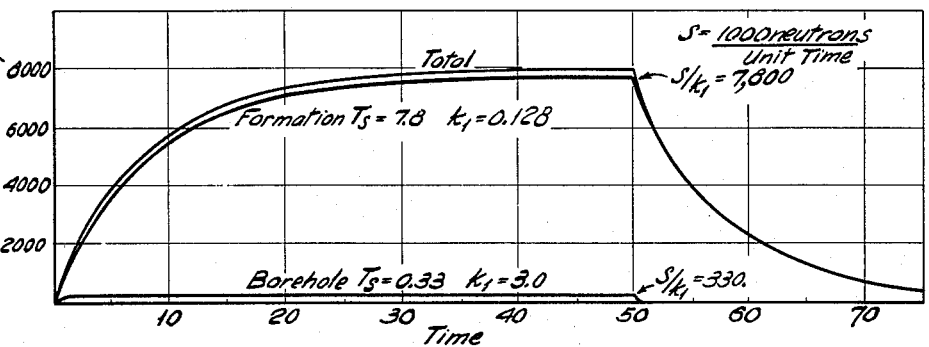
FIGURE 9a is a graph showing the total and the separate effects of a typical earth formation and contents of a typical bore hole upon the rate of change of fast neutron population density during and following a burst of fast neutrons that starts and stops abruptly.

By way of example, note the very short $T_s$ for water, oil or barite drilling mud—see FIGURE 1. Referring to FIG. 6, it may be seen that the composite curve due to the desired medium (i.e. the formation) and the foreign matter (bore hole) would consist of a foreign (bore hole) component having a waveform like FIGURE 6B rising sharply (because of short $T_s$) to a low plateau (because of small $S/k_1$) with the addition of a desired (formation) component also having a waveform like FIGURE 6B, but rising slower (because of longer $T_s$) to a higher plateau (because of large $S/k_1$). A more complete representation of the composite curve, showing each of its components, is shown in FIGURE 9A, where the data for well fluid and for a water-filled 3% porous limestone are taken from FIGURE 1. Clearly the time constant of the desired formation component alone could be determined by measuring the time to complete 63% of its rise (or decay). Note, in the case of bore hole analysis, if fast neutrons are being observed, the detector should be held close to the bore hole wall in order to "see" the fast neutron flux in the formation, but if fast n-gamma are being used, this precaution is not necessary, since the gammas from the formation can penetrate the well fluid to the detector without suffering a change in intensity as the fast neutrons would.

Figure 9B:
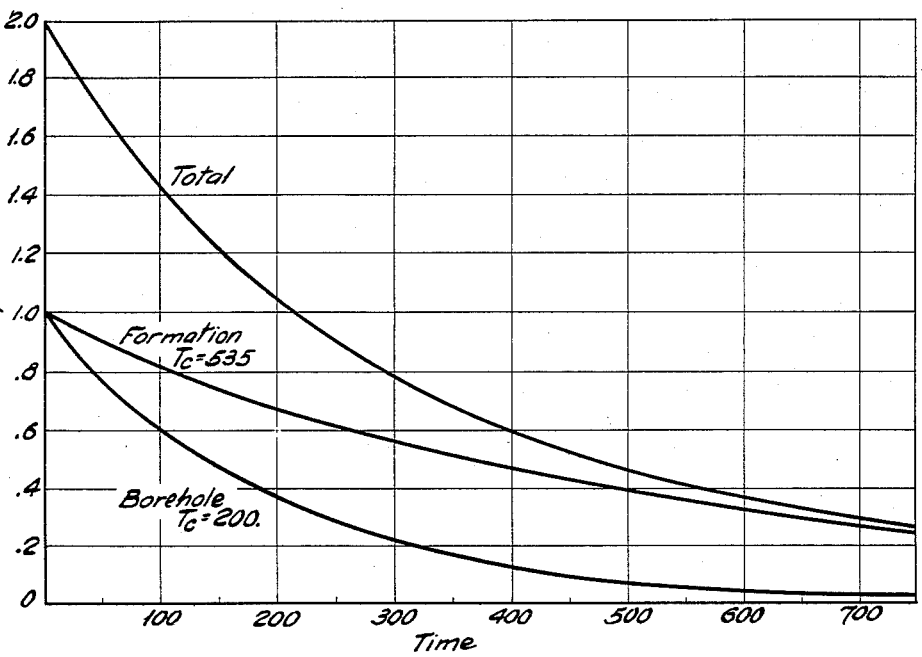

If slow neutrons such as thermal neutrons or thermal neutron-gammas are to be observed there are various ways to measure the time constants, whether $T_s$ or $T_c$, but preferably the latter. Curves 6C and 6D show the build-up and decay of thermal neutrons and thermal neutrons-gammas respectively, and these curves are seen to have the same shape, differing only in the vertical dimension. As an example of how to separate the thermal neutron curve for formation from that for bore hole see FIGURES 9B and 10. In 9B are plotted the decay portions only, of the thermal neutron population curves such as FIGURE 6C for well fluid and for a water-filled 3% porous limestone. The composite curve in 9B is obviously difficult to analyze for its components, but by replotting semi-logarithmically as in FIGURE 10, the components can easily be separated, by the method (well-known in nuclear physics) of subtracting off exponentials. Thus, given the curve labeled TOTAL in FIGURE 10, one draws the straight line which the composite curve approaches at large time values. This line is the pure exponential for formation alone. Subtracting the formation "curve" values from the TOTAL curve values gives the borehole "curve" value. Note: had the formation been shale, which has $T_c$ shorter than $T_c$ for well fluid, the first straight line drawn would have been the borehole "curve." In any case one curve that is thus subtracted out will be recognized by its 200 microsecond time constant as the borehole curve, and the other will be the formation curve. This subtracting of components can be done electrically as well as manually. In fact it is possible to build into the logging tool the means for continually subtracting off the known borehole contribution. Exponential signal generators are well-known which would serve to subtract off the borehole component continuously. The composite output would simply be mixed, at the time of each pulse of neutrons, with a negative signal adjusted in magnitude to equal the borehole n-gamma count rate, and this signal would decay with a 200 microsecond time constant.

Although the thermal neutron and thermal neutron-gamma curves are best suited to measuring $T_c$, it is possible also to obtain $T_s$, as can be seen from curves 6C and 6D. When the borehole component is subtracted out of the composite curve, the remaining curve has the fairly simple shape of 6C or 6D, where both $T_s$ and $T_c$ can be obtained by inspection, as explained above in the section entitled Computation of Time Dependent Effects.

Another way to suppress the effect of foreign matter in the vicinity of a desired medium of interest is to add a strong capturing element to the foreign matter and thus cause its thermal neutron-gamma rate to change almost instantly with the source rate itself. The remaining time dependent signal would then be due to the desired medium alone. Considering as an example the separation of the effect upon $T_c$ due to the contents of a bore hole from the effect due to the earth formation surrounding the hole, the behavior in this case would be substantially like that shown in FIGURE 9a, except that the time constants would here be those for thermal neutron capture rather than for neutron slowing down. The contribution of the foreign matter, the bore hole in the present case, would rise and drop away abruptly just as in FIGURE 9a, leaving the contribution of the desired medium, the formations, as substantially the only time-varying signal, so that its time constant, $T_c$ for the medium of interest can be readily deduced. Examples of suitable high capture additives include cadmium, which may often be added in the form of cadmium sulfide; and chlorine which may often be added in the form of saturated brine.

The technique of adding a strong capturing element to foreign matter in the vicinity of a desired medium in order to facilitate separation of the capture time of the foreign matter from that of the desired medium as applied to the analysis of an earth formation is described in greater detail and claimed in my copending patent application S.N. 546,701 filed, November 14, 1955, now Patent No. 3,102,956.

APPARATUS

Referring now to FIGURE 7a, there is shown apparatus suitable for analyzing media in accordance with the present invention. In this figure, there is shown a medium 10 to be investigated and a controlled neutron source 11 suitably positioned in the vicinity thereof for irradiating the medium. The source 11 preferably comprises an abruptly controllable apparatus such as a linear accelerator capable of pulsed operation and suitable for providing a timed burst of fast neutrons when used with a suitably chosen neutron emitting target, for example, such as that described in Nucleonics, vol. 9, pages 51–57, October 1951. Likewise, other apparatus may be used, such as a betatron in combination with a neutron-emitting target. A conventional neutron source, for example, polonium-beryllium or radium-beryllium, may be used in certain instances and a pulsed effect may be attained by means of a mechanically or electro-mechanically controlled shutter for intermittently shielding the alpha radiation employed to bombard the beryllium to produce neutrons. Suitable apparatus may comprise a shutter in the form of a rotatable disk of suitable shielding material having one or more apertures therein for intermittently exposing the neutron-emitting target to a source of alpha particles as it rotates about its axis. In any event, whatever the source of pulsed neutrons, a timer 12 is preferably suitably coupled therewith in order to control the pulse rate of the neutron source in accordance with a predetermined schedule. The output of the timer 12 is also coupled by suitable means to a plurality of display devices, shown as cathode-ray oscilloscopes 13, 14, 15, 16 in the illustrated embodiment. A plurality of radiation detectors 17, 18, 19, 20 are individually coupled to each of the display devices. More particularly, a thermal neutron detector 17 is coupled to the first cathode-ray oscilloscope 13, a fast neutron detector 18 is coupled to the second cathode-ray oscilloscope 14; a thermal neutron gamma-ray detector 19 is coupled to the third cathode-ray oscilloscope 15; and, a fast neutron gamma-ray detector 20 is coupled to the fourth cathode-ray oscilloscope 16. In accordance with the illustrated embodiment, the timer signal is applied to the horizontal deflection system of all of the display devices and each of the detector outputs signal is individually applied to the vertical deflection system of its respective display device. Each of the four detectors 17, 18, 19, 20 is positioned with respect to the pulsed neutron source 11 and the medium to be investigated 10 such that time dependent effects produced in the medium by the source may be observed by the respective detectors.

The apparatus of FIGURE 7a is adapted and arranged to provide a pulsed neutron source under control of the timer 12. The timer 12 is preferably an electronic device suitable for simultaneously triggering both the neutron source and the display devices. More particularly, the timer preferably comprises a gating circuit suitable to initiate the horizontal sweep of the respective oscilloscope at the same instant that the neutron source is triggered on or off, as the case may be. Electronic timing apparatus suitable for this purpose is well-known. (See, for example, Electronics—Experimental Techniques, by Elmore and Sands, McGraw-Hill, 1949.) Since the output of each of the radiation detectors is coupled to the vertical deflection system of its respective oscilloscope, the various time dependent effects under observation may be plotted simultaneously on the screens of the various oscilloscopes, in order to present a display having the form of one or more of the curves shown in FIGURE 6.

In accordance with one aspect of the invention employing this apparatus to determine the fast neutron slowing down time $T_s$ as a function of the fast neutron population density in the medium, for example, the timer is adjusted to send a signal to turn on the fast neutron source and simultaneously to send a signal to initiate the appropriate oscilloscope sweep. The pulsed neutron source reaches its full amplitude substantially at once and the fast neutron detector observes the rise in fast neutron population density, as affected by the neutron slowing down time $T_s$ of the medium under investigation. The output signal of the fast neutron detector will appear on the appropriate oscilloscope in graphic form and provide a direct indication of the neutron slowing down time $T_s$. Likewise, the characteristic rise of the thermal neutron population density, as determined by the fast neutron slowing down time $T_s$, and the neutron capture time $T_c$ of the medium, will be observed by the thermal neutron detector and will be displayed on the appropriate oscilloscope coupled thereto. By accounting for the initial part of the signal display, due to $T_s$, the capture time $T_c$ may be determined. Similarly, the thermal neutron gamma-ray detector and fast neutron gamma-ray detectors will provide signals characteristic of the medium under investigation which will be displayed on the screen of the appropriate oscilloscope coupled to each of these devices. These signals may be interpreted as discussed above.

Referring now to FIGURE 7b, there is shown in block form, typical apparatus such as is preferably associated with each of the radiation detectors employed in the apparatus of FIGURE 7a. The detector unit itself may be the electrical pulse producing type commonly referred to as a Geiger-Mueller detector or counter and is preferably of the multiple cathode type. Each detector unit is appropriately provided in known manner with a coating and/or shielding in order to provide optimum sensitivity for the desired effect to be observed thereby, namely, fast neutrons, thermal neutrons, fast neutron gamma-ray, or thermal neutron gamma-rays, depending upon the particular type detector desired. A suitable high voltage source is coupled to the detector for energizing it, in well-known manner. Scintillation counters may, likewise, be employed in certain instances. The output of the counter is coupled through a suitable preamplifier to a high gain amplifier, thence, to a rate meter or timer, and finally to the vertical deflection system of a cathode-ray oscilloscope. A magnetic-tape recorder or the like may be coupled to the amplifier in order to record the output signal provided thereby. Alternatively, or additionally, a trace recorder may be coupled to the rate meter either together with, or in lieu of, a cathode-ray oscilloscope.

While the apparatus of FIGURE 7a is shown comprising 4 separate detectors, each with its associated oscilloscope, in certain applications it may be desirable to employ less than four separate detector channels, say for example, only the fast neutron detector or the slow neutron detector or perhaps only these two.

In certain instances where the detector is operated intermittently, if a Geiger-Mueller tube is used as the detector unit, a gating circuit may not be required. Geiger-Mueller tubes comonly have dead times of 50 to 200 microseconds and this dead time can be utilized as the period during which the detector does not operate. One proposed method of operation might then include the step wherein the Geiger-Mueller tube is caused to go into discharge at the time of the burst of neutrons from the source. Then, at the end of the dead time, the tube automatically becomes sensitive and registers radiation from the medium under analysis. A simple method of using the start of the neutron burst to discharge a Geiger-Mueller tube and initiate the automatic time lag is to allow the first neutron induced gamma-ray that causes the tube to fire to serve as the gating signal. The duration of the neutron pulse must be chosen so that the net effect is to provide the desired delay after the end of the neutron pulse and before the activation of the detector. Thus, for example, suppose the Geiger-Mueller tube dead time is known to be 180 microseconds. If the detector is to operate immediately after cessation of the neutron source, then the neutron burst or pulse should last 180 microseconds. However, if a delay time of 130 microseconds is desired after cessation of neutrons, then the neutron pulse should last only 50 microseconds. Alternatively, the desired delay could be provided by taking a trigger pulse from the end of the neutron burst and allowing it to gate the high voltage operating potential onto the previously off tube. Sufficient overshoot of this high voltage is easily obtained to cause the tube to discharge, enter its dead time, and then automatically return to duty at the end of the dead time.

The herein described apparatus comprises a convenient and simple means for analyzing various media. However, when it is desired to make such measurement in a confined area, such as a bore hole through an earth formation, certain considerations must be observed. In general, it is necessary that such an apparatus be limited to a minimum size and weight. Accordingly, apparatus such as that shown in FIGURE 8 may be employed.

Referring particularly to FIGURE 8, a borehole 40 is shown as traversing several earth formations as 41, 42, 43 and 44. With the borehole 40 there is shown a neutron gamma-ray logging instrument 45 comprising essentially a housing 46 containing a source of neutrons 47, a radiation detector 48 such as discussed in regard to FIGURE 7, supra, and may, for example be a gamma-ray detector, and a timer or gating circuit 49. Considered broadly, the detector 48 may also include a high voltage supply which serves to activate the detector unit, per se, and a preamplifier for enhancing the detector signal for transmission to a trace recorder 50, within the housing, and to a high gain amplifier 51 at the surface. More than one detector channel may be employed if desired to determine additional information. The timer 49 contained within the housing 46 coupled to the neutron source 47 and the detector 48 to provide means for establishing the desired time relationship between the source and the detector. The logging instrument 45 is suspended by means of a cable 52 which includes suitable conductors for conveying the pre-amplified output to the surface. The cable passes over a suitable measuring device 53 by means of which the depth or position of the housing can be continuously determined in order to correlate the position of the logging head or instrument 45 with the measurement obtained thereby. The pre-amplified output of the detector 48 is coupled to the amplifier 50 at the surface which in turn, is coupled to an appropriate cathode-ray oscilloscope 54.

Referring now to FIGURE 11, there is shown apparatus for carrying out the above-discussed method for analyzing a hydrocarbon or brine solution by repetitively determining the neutron capture time $T_s$ of a solution to be observed in a chemical processing system. In particular, there is shown a processing vat or tank wherein a liquid to be monitored is processed. A conduit is shown coupling the processing tank to a storage tank. Neutron capture time $T_c$ apparatus is shown located adjacent the conduit coupling the processing and the storage tanks and may comprise apparatus such as that discussed above and, for example, may be similar to that shown in FIGURE 7 of the drawing. The neutron capture time apparatus may include an indicating device, such as an oscilloscope, or a recorder for recording the value of the capture time $T_c$ as a measurement of either the salinity of a brine solution or the hydrogen-to-carbon atomic ratio of a substantially pure hydrocarbon. Inasmuch as the invention is primarily concerned with a characteristic of matter within the system rather than with a chemical process, per se, it is believed unnecessary to elaborate on the various reasons for employing such an apparatus. However, it is noted that the salinity of a brine solution may be used in certain instances as an indirect process in a chemical system to provide information regarding the concentration of other constitutents in a solution or otherwise contained in a substance employed in a chemical system.

By comparing the time constant $T_c$ of the solution being monitored against a pre-established standard, any deviation therefrom may be employed to give a correction factor which, in turn, may be used to control a mixing valve or other apparatus for controlling the hydrogen-to-carbon atomic ratio or salinity of the monitored solution in order to maintain a desired standard. Such may be accomplished by known electro-mechanical techniques. This feature is illustrated in FIGURE 12, wherein a mixing valve is shown under the control of neutron capture time apparatus for maintaining a predetermined ratio of constituents from a first and second processing tank. For example, the neutron capture time $T_c$ may be converted into an electric signal and compared with a desired standard signal produced by means of a standardized time-constant circuit having the desired build-up or decay characteristic such as an R–C circuit of the appropriate value. Any deviation from the standard signal may then be employed to provide a control signal of proper amplitude and polarity for controlling a valve or other apparatus in accordance with known control techniques.

While certain specific embodiments have been shown and described, it will, of course, be understood that various modifications may be made without departing from the principles of the invention. The appended claims are therefore intended to cover any such modifications within the true spirit and scope of the invention.

I claim:
1. The method of analyzing a medium which comprises irradiating the medium with neutrons in a manner characterized by an abrupt rise in source rate and during said irradiating of said medium with neutrons and during predetermined time intervals, detecting first and second radiations emanating from the medium as a result of said irradiation and providing a signal indication of the rate of change in intensity of the detected radiation in such manner as to obtain an indication of both the slowing down rate and neutron capture time of the medium under analysis.

2. The method of analyzing a medium which comprises irradiating the medium with fast neutrons in a manner characterized by an abrupt rise in source rate, detecting a first radiation emitted from the medium during a predetermined time interval occurring during said irradiating subsequent to said abrupt rise when the neutron population density in said medium is in a transient condition due to said abrupt rise, during another predetermined time interval occurring during said irradiating subsequent to said abrupt rise when the fast neutron population density in the medium has attained a substantially steady condition and the slow neutron population density in the medium is still in a transient condition as a result of said abrupt rise in source rate detecting a second radiation emitted from said medium, providing a first signal indication showing the rate-of-change in intensity of said first radiation during said first-mentioned predetermined time interval as an indication of the neutron slowing down time $T_s$ characteristic of the medium, and providing a second signal indication showing the rate-of-change in intensity of said second radiation detected during said other predetermined time interval as an indication of the thermal neutron capture time $T_c$ characteristic of the medium.

3. The method of claim 2 wherein said first radiation consists essentially of fast neutrons and wherein said second radiation consists essentially of slow neutrons.

4. The method of claim 2 wherein said first radiation consists essentially of fast neutron gamma radiation and wherein said second radiation consists essentially of slow neutron gamma radiation.

5. The method of claim 2 which further comprises the step of providing a signal indication indicative of the ratio of the first and second radiations indicative of the neutron slowing down time $T_s$ and the neutron capture time $T_c$, respectively.

6. The method of claim 2 wherein said medium comprises earth formations along the traverse of a borehole and wherein said method is repeated with respect to a plurality of samples of said medium at successive locations along the traverse of the borehole and wherein said first and second radiations are recorded in correlation with the position of the respective samples of the medium which are irradiated and from which the first and second radiations are emitted, and wherein the resultant radiation signals are correlated with data indicative of suspected elements along the traverse of the borehole.

7. Apparatus for analyzing a medium comprising a source of pulsated neutrons for irradiating the medium under analysis, said source being adapted to produce neutron bursts of predetermined duration at a predetermined repetition rate, means for detecting radiation emanating from the medium as a result of irradiation by the source, said radiation detecting means comprising a Geiger-Mueller type detector having a predetermined characteristic dead time, said detector being responsive to the production of said bursts of neutrons by said source so that it is caused to go into discharge at the time of a burst of neutrons from the source whereby it is rendered insensitive for the period of its dead time and thence becomes sensitive to radiation emanating from the medium as a result of neutrons from the source, a signal display device coupled to said detector for providing information concerning detected radioactivity and including means for correlating the rate-of-occurrence of detected radioactivity throughout a predetermined time interval.

References Cited by the Examiner

UNITED STATES PATENTS

| | | | |
|---|---|---|---|
| 2,275,748 | 3/1942 | Fearon | 250—83 |
| 2,678,397 | 5/1954 | Herzog | 250—83.6 |
| 2,737,595 | 3/1956 | Scherbatskoy | 250—83.6 |
| 2,744,199 | 5/1956 | Juterbock et al. | 250—43.5 |
| 2,769,096 | 10/1956 | Frey | 250—83.6 |
| 2,991,364 | 7/1961 | Goodman | 250—83.6 X |
| 2,996,618 | 8/1961 | Goodman et al. | 250—83.6 X |

FOREIGN PATENTS 724,441  2/1955  Great Britain.

RALPH G. NILSON, *Primary Examiner.*

ELI J. SAX, *Examiner.*

ARCHIE R. BORCHELT, *Assistant Examiner.*